United States Patent [19]

Eckstein et al.

[11] 4,065,541
[45] Dec. 27, 1977

[54] METHOD OF MAKING PLASTIC CARTRIDGE CASING

[75] Inventors: George R. Eckstein, Fairfield; William G. Moyher, Stratford, both of Conn.

[73] Assignee: Remington Arms Company, Inc., Bridgeport, Conn.

[21] Appl. No.: 470,757

[22] Filed: May 17, 1974

Related U.S. Application Data

[62] Division of Ser. No. 374,336, June 28, 1973, Pat. No. 3,855,381, which is a division of Ser. No. 199,913, Nov. 18, 1974, Pat. No. 3,786,755.

[51] Int. Cl.² .................................................. B29F 5/00
[52] U.S. Cl. ............................... 264/295; 264/296; 264/320; 264/322
[58] Field of Search ............... 264/292, 296, 320, 322, 264/295

[56] References Cited

U.S. PATENT DOCUMENTS

| 2,961,717 | 11/1960 | Morin | 264/322 X |
|---|---|---|---|
| 3,185,095 | 5/1965 | Mayer | 264/320 X |
| 3,284,560 | 11/1966 | King | 264/292 |
| 3,418,409 | 12/1968 | Hesse | 264/296 X |

Primary Examiner—Richard R. Kucia
Attorney, Agent, or Firm—John H. Lewis, Jr.; Nicholas Skovran; William L. Ericson

[57] ABSTRACT

A method of making a primer seal for a one-piece plastic shotgun shell, i.e. where the tubular body and base portion are integral, by extruding a ring of plastic around the primer opening and then forcing the plastic ring inside the primer opening to form a continuous, annular, gas sealing ring of plastic within the primer opening.

1 Claim, 19 Drawing Figures

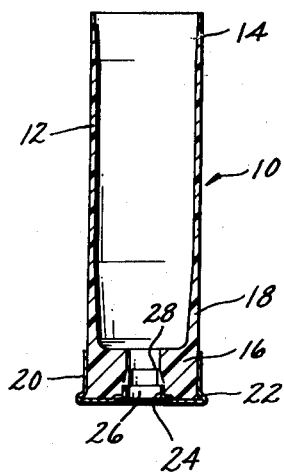
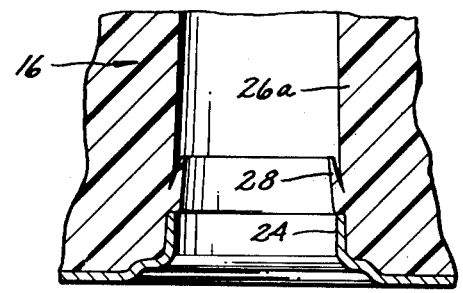
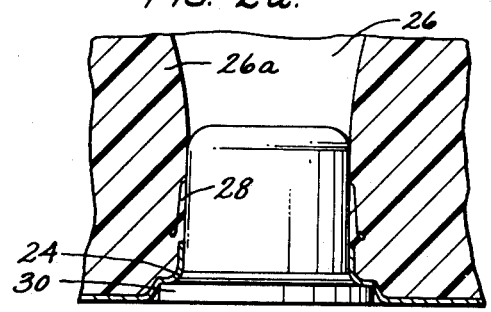
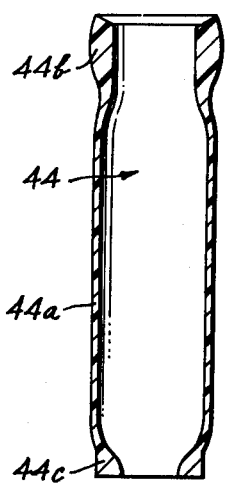
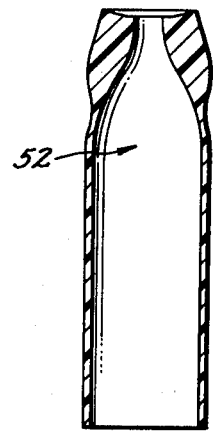
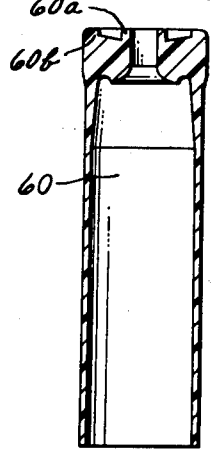
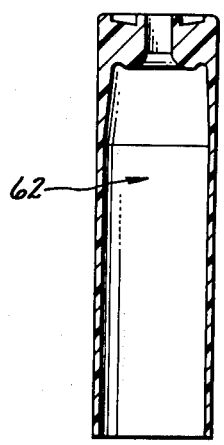
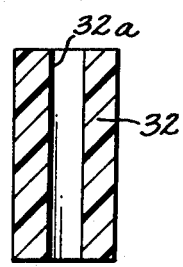
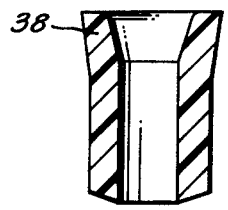

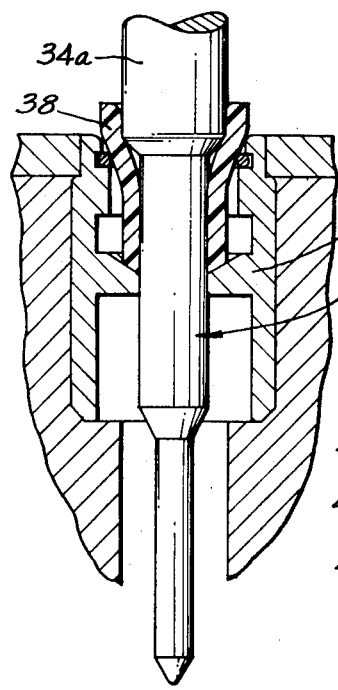
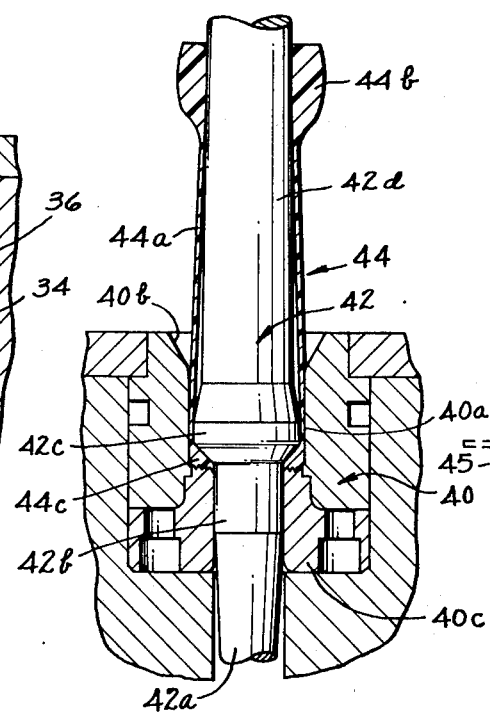
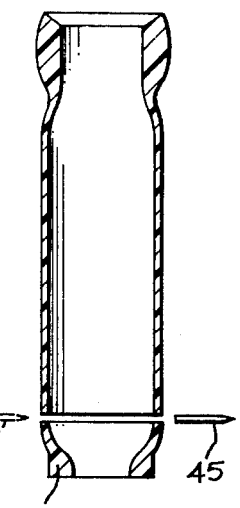
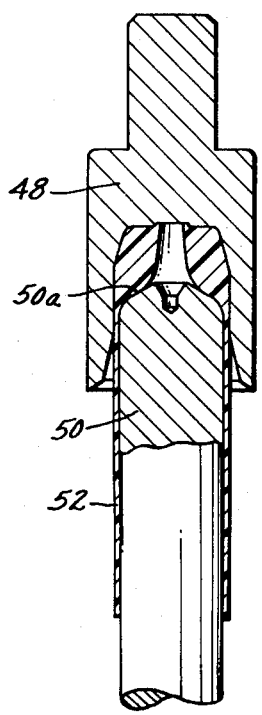
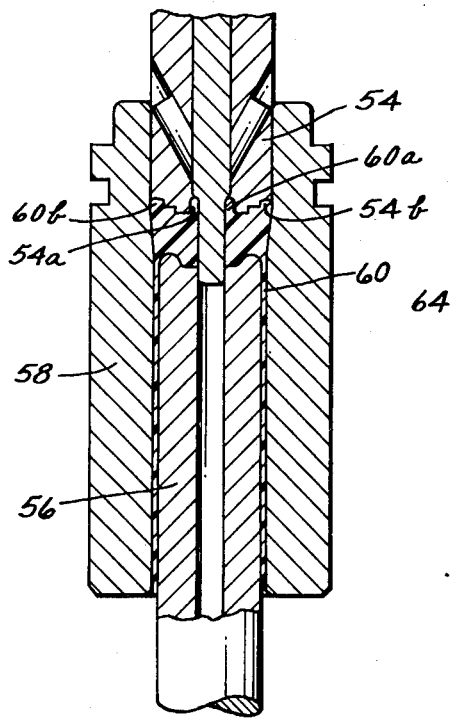
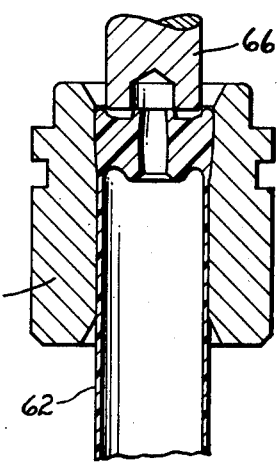

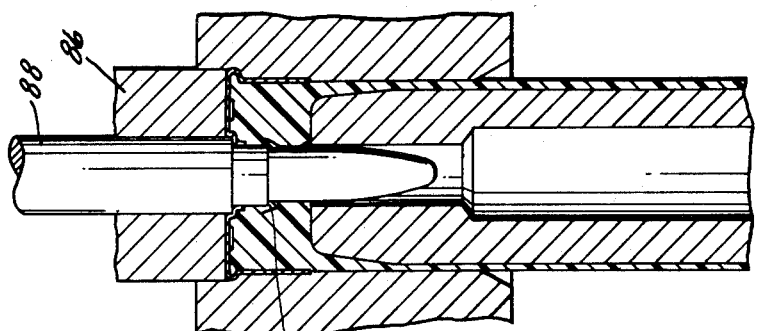
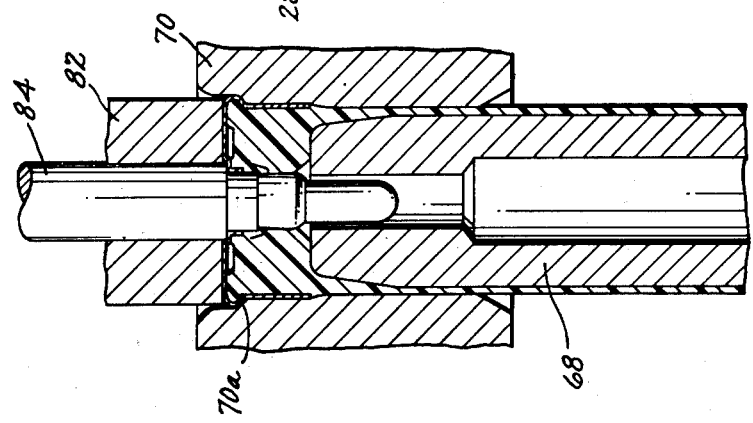
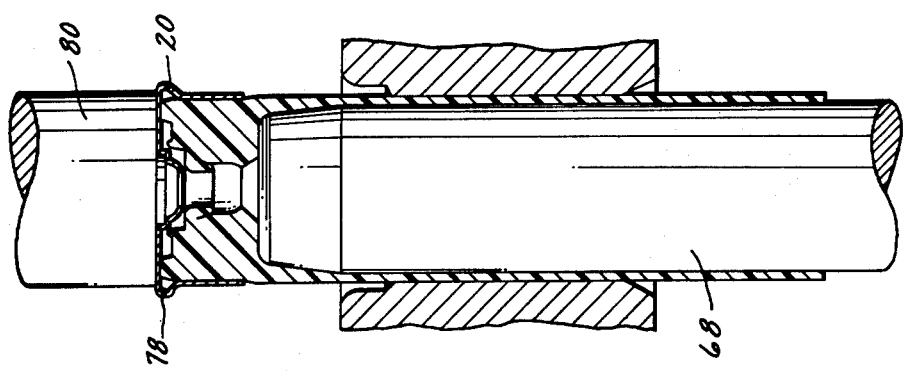
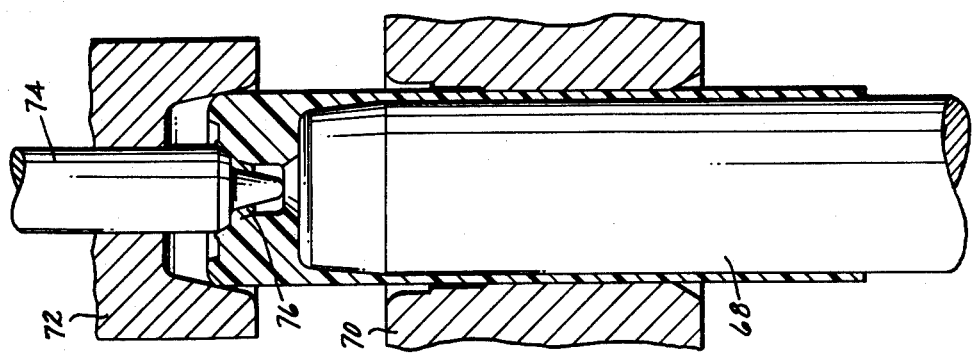

METHOD OF MAKING PLASTIC CARTRIDGE CASING

This application is a division of co-pending application Ser. No. 374,336 now U.S. Pat. No. 3,855,381, filed by George R. Eckstein et al on June 28, 1973, which was a division of U.S. Pat. No. 3,786,755, issued to said George R. Eckstein et al on Jan. 22, 1974 and which was originally filed as Ser. No. 199,913 on Nov. 18, 1971.

This invention relates in general to an improved plastic cartridge casing and the method of making the casing. More specifically, the invention relates to a one-piece cartridge casing of thermoplastic material which is formed by expanding at least a portion of a plastic slug in two directions to form a highly bi-axially oriented tubular body portion and a thickened rear section, which rear section is then substantially deformed to provide the base portion of a shotgun shell including a novel primer sealing means.

The use of bi-axially oriented plastic, i. e. high density polyethylene, in shotgun shells, began in this country in the early 1960's as a result of the invention claimed in the Covington et al U.S. Pat. No. 3,103,170, issued Sept. 10, 1963. Today, all the major U.S. and Canadian manufacturers provide plastic shells with bi-axially oriented bodies. Since that time, the practice of the consumer reloading his shotshell casings has increased substantially so that ammunition being manufactured today must take the reloader into consideration.

The advantages of providing a one-piece plastic shell, i. e. with base portion integrally formed with the body portion, are well known and need not be repeated here. One-piece shells have been known for a long time. See U.S. Pat. No. 1,364,871 to Ernst dated Jan. 11, 1921; U.S. Pat. No. 2,232,634 to Roberts et al dated Feb. 18, 1941; U.S. Pat. No. 2,349,970 to Lambeek dated May 30, 1944; U.S. Pat. No. 3,171,350 to Metcalf dated Mar. 2, 1965; U.S. Pat. No. 3,284,560 to King et al dated Nov. 8, 1966; U.S. Pat. No. 3,377,951 to Larson dated Apr. 16, 1968; and French Pat. No. 1,170,851 (Core) published on Jan. 20, 1959.

Some of the shells described in the Patents cited above are plastic shells having integral body and base portions which were developed from injection molded slugs or starting pieces and which require that the finished head and basewad portion remain in substantially as-molded condition, free from deformation and orientation. Unlike such shells, all portions of the basewad portion of the present invention undergo substantial degrees of cold plastic deformation with the usual results on the physical properties of the cold-worked plastic.

The present process is an adaptation of a process originally used to make aluminum shotshell and center fire cases. See U.S. Pat. No. 2,668,345 to G. R. Eckstein issued on Feb. 9, 1954. However, there are differences in working with plastic, some of which will be described during the explanation of the process below.

A particular point of novelty, in the present case, is the primer gas sealing means and the method of forming the gas sealing means. There are various means presently in use or proposed for use which call for gas sealing rings or skirts located at the front end of the primer bore which are in direct contact with the propellant means so that they are moved by the explosive combustion pressure in the shell to engage the front end of the primer to effect gas sealing.

As long as these gas sealing rings remain intact, reasonable sealing of the explosive gases between the primer and the primer bore can be expected. However, if the gas sealing ring becomes detached or broken, as sometimes happens when reloading a spent shell, the gas sealing means is rendered inoperative and the shell becomes useless for further reloading.

Because the primer sealing ring of the present invention is found inside the primer bore, it is protected to some degree from mis-aligned depriming pins and thus is less susceptible to being damaged.

It is a general object of this invention to provide a cartridge of thermoplastic material in which the tubular body portion and integrated base portion are oriented, the tubular body portion to a high degree and the integral base portion to a substantially lesser degree. A particular object of the invention is to provide a novel primer sealing means which will be effective to seal a variety of lengths and diameters of primers.

These and other objects, features, and advantages of the invention will be more fully brought out in the following specification, claims and drawings in which:

FIG. 1 is a cross-sectional view of a one-piece plastic shotshell made according to the present invention.

FIG. 2 is an exploded cross-sectional view of the primer opening and the associated gas sealing ring.

FIG. 2A is the same view as FIG. 2 except that a primer means is shown in place.

FIG. 3 is a cross-sectional view of the starting plastic slug.

FIG. 4 is a cross-sectional view of a radially expanded slug which has also been flared at one end.

FIG. 5 is a cross-sectional view of the impact-extruded plastic body with a thickened wall portion at one end of and on the exterior of the body.

FIG. 6 is a cross-sectional view of the extruded plastic body after the forward end is trimmed and the thickened rear end portion inverted so that the mass of plastic is now inside the body.

FIG. 7 is a cross-sectional view of the plastic body after the thickened rear end portion is deformed to form a cartridge base portion with a primer opening and an extruded ring surrounding the portion of the primer opening opposite the tubular body section.

FIG. 8 is a cross-sectional view of the plastic body of FIG. 7 after sizing.

FIG. 9 is a cross-sectional view of the punch and die arrangement for the perform step which results in an expanded and flared preform as shown in FIG. 4.

FIG. 10 is a cross-sectional view of the punch and die arrangement for the impact extrusion step which results in an oriented body as shown in FIG. 5.

FIG. 11 is a schematic view of a trimming means which removes the lower end of the body member shown in FIG. 5.

FIG. 12 is a cross-sectional view of the shrouding bunter and support means of the folding or inverting step which results in the plastic cartridge casing shown in FIG. 6.

FIG. 13 is a cross-sectional view of the bunter and die means of the pre-heading step which results in the cartridge casing shown in FIG. 7.

FIG. 14 is a cross-sectional view of the plastic cartridge casing being pushed through a sizing die.

FIG. 15 is a cross-sectional view of the rearwardly extending extruded collar on the pre-headed plastic cartridge being impacted to form a forwardly extending annular ring which eventually becomes the primer sealing ring.

FIG. 16 is a cross-sectional view of feeding the metal cap to the plastic shell.

FIG. 17 is a cross-sectional view showing the first heading bunt in which the metal cap is attached to the plastic shell and the primer sealing ring is pushed into shape.

FIG. 18 is a cross-sectional view of the main or final bunt in which the metal-capped plastic shell is formed to final dimensions.

Referring now to the drawings, FIG. 1 shows a shotgun shell casing 10 having a tubular body portion 12 which may be skived to form a tapered end 14 at its mouth end and which has an integrally formed transverse base portion 16 at the breech end of the shell. The tubular body portion 12 is essentially of uniform wall thickness although the rear portion 18 tapers slightly near the base portion. A conventional metal head member 20, of brass, steel, or any other suitable metal, is attached to the base portion 16 primarily by an annular rim 22 integral with the base portion 16 and by the annular metal skirt 24 which projects inwardly into the primer opening 26 of the base portion. Integral with the base portion 16 is a continuous gas sealing skirt 28 which projects inwardly towards the center of the opening to form an annular ring having a bore which is less than the primer bore. An alternative method of attaching the metal cap to the plastic base portion is to provide a plurality of prongs (not shown) in place of the annular metal skirt 24 and embed the prongs in the plastic base portion.

A primer 30 is inserted by force fit into the primer bore and extends past the forward end of the primer sealing skirt 28 so that the skirt forms a continuous surface with the cylindrical wall surface 26A of the primer bore. (See FIG. 2A) It can be seen that the gas sealing skirt does not come into direct contact with the combustion heat and gases which result from the ignition of the propellant means. Thus, it can be expected that there will be less erosion of the primer seal as a result of the hot combustion gases.

The gas sealing skirt 28 utilizes a collar of plastic drawn out to an oriented section and buttresses with a tight fitting primer bore to concentrate stresses across a thin band or line of contact between plastic and primer.

It should be recognized that the working or shaping of many thermoplastics, and especially polyethylene, is an art as contrasted to the working of metals. In the case of polyethylene, the pieces of plastic shaped by tools bear little resemblance in profile and dimension to the tools that did the shaping. These tools must be so shaped to compensate for the high degree of dimensional recovery that is typical of polyethylene after a severe cold-forming operation. In general, any plastic that can be mechanically deformed below its melting point can be processed according to the present process.

The starting point of the process is to provide a tubular plastic slug 32. (See FIG. 3) This plastic slug can be made in various ways but from the standpoint of economy, it has been found that extruded plastic heavy-walled tubing, cut to proper length, can be used very conveniently and economically.

The process which has been developed involves the utilization of operating die sets of the progressive transfer type so that the time interval between steps is measured in fractions of a second. For this reason, the configurations and shapes of the workpieces shown in the FIGS. 4 through 7 are not entirely correct since the plastic after deformation takes some time to recover to the dimensions shown in the FIGURES. It is impossible to accurately measure the shape of the plastic immediately after removal from the dies since the plastic is in the process of elastic recovery and change due to this "memory". The FIGURES thus represent sketches of workpieces which have been withdrawn from the process at that particular point and allowed to cool and attain a stable value.

The processing described in the following text can be accomplished on slugs at ambient temperature. Although a single-action press with auxiliary motions for powering transfer bars and undermotion knockout sleeves was used for most of the development work, the production presses can be relatively high speed and large enough to handle multiple rows of tools.

Slugs 32 are fed to each row of tools end to end (not shown) and are positioned over the first mechanical working station called "perform". There are two tools used in this station, a top punch 34 and a support die 36. (See FIG. 9)

An important function of the preform step is to stretch the slug radially and prepare it to fit accurately into the die bore of the next processing step (impact extrude). Since plastic has a large elastic recovery and a "memory" factor, it is necessary to select tool diameters of punch 34 so that the slug is overstretched. The uppermost portion 34a of punch 34 establishes a top flare on the preform to add a safety factor for punch entrance in the next operation.

FIG. 9 shows tool positions at the bottom of the machine stroke. On the upstroke, the preform is lifted up and is stripped against a stationary bushing (not shown).

The preform is then moved into axial alignment for the next operation called impact extrude. (See FIG. 10) Impact extrude is a severe mechanical operation and requires the greatest thrust of any of the steps in the process.

There are two tools used in this step, a die 40 and an extrusion punch 42. Punch 42 has a series of important dimensions and profiles. Beginning at the lower extremity, it has a taper section 42a, then a straight cylindrical section 42b, an enlarged knob-shaped working punch land 42c, and finally the support shank 42d of the punch.

Tapered section 42a enters the bore of preform 38 and expands it radially into contact with the extrusion die bore 40a. Preform 38 can be at room temperature or at an elevated temperature below the crystalline melt temperature for the plastic being used. The diameter of cylindrical section 42b of the punch and the bore 40a are so related that the preform does not wrinkle or buckle when the working punch land 42c begins the actual impact extrusion of the plastic. The diameter of working punch land 42c is selected to clear the die bore 40a by an amount which will produce the desired wall thickness in the body of the finished shell. However, because of the elastic recovery of the plastic, the actual clearance between the punch and die is much less than the shell wall thickness produced.

The support shank 42d of the punch is back tapered to minimize the area of shell in contact with the punch at the instant of extrusion since the thick collar at the top of the extrusion (which becomes the base of the shell) contracts very rapidly. The extrusion die 40 includes a flared mouth 40b which is critical in establishing the wall thickness gradient between the tubular body section and the head portion of the finished shell. The amount of energy liberated at each stroke is enough to require water cooling of punch 42. This may be accomplished by any well-known means.

It can be seen from FIG. 5 and FIG. 10 that the plastic workpiece has been substantially elongated in the axial or longitudinal direction and that an impact-extruded component 44 has been formed which has a substantially straight walled tubular body portion 44a and a thick walled rear end section 44b, which thick wall is on the exterior of the body member. The forward end 44c, shown between punch land 42c and die insert 40c, is important to keep the tools from striking each other.

The next operation performed on the shell is to trim the excess portion 44c from the forward or mouth end of the shell. This can be done by lancing with a knife or by any other well-known means. FIG. 11 shows the portion 44c detached from the component after the component has been moved past the lancing means 45. After the removal of the portion 44c, the shell mouth of the trimmed component 46 is at complete open bore and can be supported with a full diameter stem within the next station which is called profile inversion.

Profile inversion is a gathering or inversion of plastic which has been positioned on the exterior of the workpiece at its upper end. This operation serves to crudely form the shell head and prepare it for final forging. This operation uses two basic tools, a bunter 48 and a stem 40. (See FIG. 12).

Stem 50 has a precision profiled nose 50a and is inserted in the trimmed impact extruded component 46 to support the shell while shroud-like bunter 48, with its profiled bore, establishes the required bore and diameter of the head section in the component. In operation, the trimmed impact extrusion 46 is located in axial alignment with stem 50. The bunter 48 descends and drives the workpiece over the stem and effects a diameter reduction of the component top. At some instant in the stroke, the clearance between stem 50 and the bore of bunter 48 serves to lock and support the component for further compression and inward folding. The component 52 is then removed from the stem 50 and moved to the next station called pre-heading. (See FIG. 13)

It is the purpose of pre-heading to complete the dimensional and profile requirements for the head of the shell.

The pre-head station utilizes three main tools to support and forge the plastic workpiece or component, i. e. a bunter 54, a stem 56, and a die means 58. The component 52 is supported by a stem 56 and a die 58 and is compressed by a bunter 54 which has a complex series of contours to form the preheaded component 60. The counterbore 54a fashions the extruded collar 60a and the corner cutaway 54b produces the rim 60b. Extruded collar 60a surrounds the primer bore and subsequently will be deformed to become the primer gas seal. Rim 60b will be reformed to become the rim fill of the cap which is added in a later step of the process.

In operation, the profile inversion component 52 is driven by the bunter 54 into the die 58 as well as over the stem 56. Preheading is a high-thrust operation in which plastic flows and extrudes into all free space that is vented. This flow makes it possible to form the collar 60a and the rim 60b. The flow also verifies the tapered wall between the head and body sections of the shell.

FIG. 13 shows the tool position at the bottom of the stroke. Again the component is lifted from stem 56 and die 58 on the upstroke, preferably by means of a knock-out sleeve (not shown).

The pre-headed component 60 is then transferred into axial alignment with the last station in the progressive die set. It is a simple sizing operation. (See FIG. 14) There are two tools used, a die 64 and a punch 66. In operation, the pre-headed component 60 is pushed mouth down through the die 64. The position of the tools shown in FIG. 14 is a mid-point in the downstroke of the press.

The sizing operation serves as a corrective means, attained with inexpensive tooling, for establishing a desired body diameter on the finished shell.

After mechanical processing, the sized components 62 are washed free of lubricant and simultaneously stabilized dimensionally by using a hot water wash. The temperature of the wash is selected to coincide with the maximum temperature expected in storage conditions for the finished shells. Higher temperatures at wash accomplish dimensional stability in shorter times. For this purpose, 170° F for 20 minutes is suitable.

Components thus washed and stabilized are ready for the assembly with metallic caps and primers. Basically, the equipment includes a stem 68 and a die 70. (See FIGS. 15-18) In practice, the support stem 68 is positioned to hold the component well above the heading die 70 for the first working station (FIG. 15) of this series. A shroud-like bunter 72 with center punch 74 inverts the collar 60a (FIG. 7) into position 76 and the rim 60b (FIG. 7) is tapered inwardly for ease in applying the metal cap 20 in the following work station.

FIG. 16 shows the cap 20 in place. The cap 20 has been half headed, i. e. the preparation for the primer and the rim bulge 78 made in a separate operation. A simple flat end punch 80 is used for seating the cap.

FIG. 17 shows the stem 68 dropped to align the capped shell within the die 70 at matching position of die shoulder 70a with cap bulge 78. Bunter 82 with center punch 84 drives the shell into location. The inverted collar 76 is drawn out into a thinner section and the rim material 60b is displaced into the cap bulge 78.

FIG. 18 shows the finishing bunting of the shell. Bunter 86 with center pin 88 is critically profiled to provide finished dimensions to the gas sealing collar and the primer bore. Also at this station, the metalic rim of the cap 20 is compressed to hold onto the plastic fill that has been prepared in the previous station (FIG. 17). The top area on the cap which will receive the flange of the battery-cup type primer is also verified at this station.

In all of FIGS. 15-18, the punches and bunters are shown at the bottom of the press stroke.

Priming the shell may be done by the conventional method of inserting and seating of a regulation battery-cup type of shotshell primer. The location of the gas sealing collar 28 is such that it will function with a shorter battery cup usually found in European made shotshells or with longer battery-cup primers generally used in the U.S.

Because of elastic recovery and "memory", the extruding of plastic between a punch and die does not result in a plastic article having the shape and dimensions of the space between the punch and die.

A substantial amount of deformation and movement of plastic is necessary to achieve the desired results in the present invention. For example, a slug as shown in FIG. 3 having an O. D. of 0.665 inch and an I. D. of 0.230 inch is expanded at the base end 44b in FIG. 5 in the impact extrude step to an O. D. of 0.912 inch and an I. D. of 0.495 inch and finally forged, sized, etc. to a finished shell having a base O. D. of 0.790 inch and a primer bore of 0.220 inch.

The impact extruded dimensions listed above are the "cooled" dimensions and are not the dimensions of the plastic workpieces at the time they are subjected to deformation in the die set. Accordingly, the tool dimensions are somewhat greater than those listed for the plastic since the plastic workpieces must be expanded before elastic recovery and "memory" takes over. However, the dimensions are relatively accurate so that some indication can be gained as to the amount of radial deformation of the plastic slug.

It can also be seen that the elongated, thickened endwall portion 44b (FIG. 5) is deformed substantially in order to finish as the base portion 16 of the final shell (FIG. 1). Thus, there are specific portions of the base portion 16 which are at least moderately oriented or deformed, e. g. primer seal ring 28 and annular rim 22. Other sections of the base portion, because of the substantial cold working of the plastic to achieve the shape and dimensions of the final shell, can be expected to be oriented and strengthened to some degree. The tubular body wall portion 12, of course, is highly oriented in a longitudinal as well as a circumferential direction.

What is claimed is:

1. A method of making a primer seal for a plastic shotgun shell comprising forming of a tubular plastic body having an integral transverse base portion with a longitudinally extending primer opening therein, extruding a collar of plastic around the primer opening which projects rearwardly from the rear face of the base portion to establish a volume of plastic at the correct radial distance from the axis of the shell, forcing said plastic collar forwardly so as to position the plastic material of said collar inside said primer opening so as to form a continuous, annular gas sealing ring of oriented plastic which is integral with and has a smaller diameter than the remaining side wall of the primer opening.

* * * * *